United States Patent
Ino et al.

(10) Patent No.: US 12,501,156 B2
(45) Date of Patent: Dec. 16, 2025

(54) CONTROL APPARATUS, LENS APPARATUS, IMAGE PICKUP APPARATUS, IMAGING SYSTEM, CONTROL METHOD, AND STORAGE MEDIUM

(71) Applicant: CANON KABUSHIKI KAISHA, Tokyo (JP)

(72) Inventors: Tomohiro Ino, Tochigi (JP); Satoshi Maetaki, Tochigi (JP); Tomoki Tokita, Tochigi (JP); Yuki Shinzato, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/480,882

(22) Filed: Oct. 4, 2023

(65) Prior Publication Data

US 2024/0129629 A1   Apr. 18, 2024

(30) Foreign Application Priority Data

Oct. 11, 2022   (JP) ................................ 2022-163359

(51) Int. Cl.
*H04N 23/68* (2023.01)

(52) U.S. Cl.
CPC ......... *H04N 23/683* (2023.01); *H04N 23/685* (2023.01)

(58) Field of Classification Search
CPC .................................................. H04N 23/683
See application file for complete search history.

(56) References Cited

U.S. PATENT DOCUMENTS

| 8,144,203 B2 * | 3/2012 | Washisu | H04N 23/687 348/208.99 |
| 9,838,605 B2 | 12/2017 | Tsuchiya | |
| 11,146,732 B2 * | 10/2021 | Ino | H04N 23/6812 |
| 11,212,430 B2 * | 12/2021 | Kawai | H04N 23/687 |

(Continued)

FOREIGN PATENT DOCUMENTS

| JP | 2004040298 A | * 2/2004 | ............. H04N 5/232 |
| JP | 2010096938 A | 4/2010 | |

(Continued)

OTHER PUBLICATIONS

Tanaka Yoshiharu; JP 2004-40298A; Imaging Apparatus and Imaging Lens; Feb. 5, 2004; English Translation (Year: 2004).*

(Continued)

*Primary Examiner* — Cynthia Segura
(74) *Attorney, Agent, or Firm* — ROSSI, KIMMS & McDOWELL LLP

(57) ABSTRACT

A control apparatus for use in an imaging system that includes a first correcting member movable for image stabilization and provided to one of an image pickup apparatus and a lens apparatus detachably attachable to the image pickup apparatus, and a second correcting member movable for the image stabilization and provided to the other of the image pickup apparatus and the lens apparatus acquires first correction ratios of the first correcting member and the second correcting member for angular shake of the imaging system, and second correction ratios of the first correcting member and the second correcting member for shift shake of the imaging system.

11 Claims, 9 Drawing Sheets

(56) References Cited

U.S. PATENT DOCUMENTS

| | | | |
|---|---|---|---|
| 2015/0281581 A1* | 10/2015 | Sakurai | H04N 23/6812 |
| | | | 348/208.2 |
| 2018/0063443 A1* | 3/2018 | Ikeda | H04N 23/687 |
| 2019/0289216 A1* | 9/2019 | Ito | H04N 23/687 |
| 2020/0077024 A1* | 3/2020 | Sudo | H04N 23/663 |
| 2020/0260010 A1* | 8/2020 | Nakajima | G03B 5/00 |
| 2021/0092296 A1* | 3/2021 | Kuribayashi | H04N 23/6812 |
| 2021/0105408 A1* | 4/2021 | Hirai | H04N 23/667 |
| 2021/0120162 A1* | 4/2021 | Tanaka | H04N 23/667 |
| 2021/0243372 A1* | 8/2021 | Sugita | H04N 23/663 |
| 2022/0264010 A1* | 8/2022 | Ito | H04N 23/681 |
| 2022/0321786 A1* | 10/2022 | Shinzato | G02B 27/646 |
| 2023/0217112 A1* | 7/2023 | Ino | H04N 23/687 |
| | | | 348/207.99 |
| 2024/0114244 A1* | 4/2024 | Shinzato | H04N 23/6812 |

FOREIGN PATENT DOCUMENTS

| | | |
|---|---|---|
| JP | 6410431 B2 | 10/2018 |
| JP | 2020095069 A | 6/2020 |

OTHER PUBLICATIONS

Search and Examination Report issued in GB Appln. No. 2315084.0, mailed Feb. 23, 2024.

\* cited by examiner

START POINT OF ARROW  IMAGE POINT POSITION OF OBJECT IMAGE IN STATIONARY STATE

END POINT OF ARROW  IMAGE POINT POSITION OF OBJECT IMAGE WHEN ANGULAR SHAKE OCCURS

START POINT OF ARROW  IMAGE POINT POSITION OF OBJECT IMAGE IN STATIONARY STATE

END POINT OF ARROW  IMAGE POINT POSITION OF OBJECT IMAGE AFTER IMAGE STABILIZATION FOR ANGULAR SHAKE

CONTROL APPARATUS, LENS APPARATUS, IMAGE PICKUP APPARATUS, IMAGING SYSTEM, CONTROL METHOD, AND STORAGE MEDIUM

BACKGROUND

Technical Field

One of the aspects of the embodiments relates to a control apparatus, a lens apparatus, an image pickup apparatus, an imaging system, a control method, and a storage medium.

Description of Related Art

Some conventional imaging systems perform hybrid image stabilization by combining image sensor image stabilization for performing image stabilization by moving an image sensor and in-lens image stabilization for performing image stabilization by moving part of lens units in an imaging optical system.

Japanese Patent No. 6410431 discloses an imaging system that expands an image stabilization range for the entire imaging system by properly setting correction ratios of the image sensor image stabilization and the in-lens image stabilization.

Japanese Patent Laid-Open Publication No. 2010-096938 discloses an imaging system that corrects image blurs caused by angular shake and shift shake by moving an image stabilizing lens.

In an imaging optical system that uses the central projection method, an image point moving amount during image stabilization differs between the central portion and the peripheral portion of the image. FIG. 9A illustrates the magnitude and direction of an image point moving amount at each image point on an object image in a case where image blur occurs in an −X direction at a central portion of the image due to so-called angular shake, that is, rotation of the imaging optical system in a pitch or yaw direction. FIG. 9B illustrates the magnitude and direction of an image stabilization residue amount at each image point on the object image in a case where the image blur that occurs at the central portion of the image in FIG. 9A is corrected using the image sensor. As illustrated in FIG. 9A, the image point moving amount in the peripheral portion of the image is larger than that in the central portion. Therefore, as illustrated in FIG. 9B, the image blur is corrected in the central portion, but the influence of the image blur remains in the peripheral portion, and the image point remains significantly moved.

Under normal imaging conditions, the influence of angular shake is large, but image degradation due to so-called shift shake, which is applied in directions parallel or orthogonal to the optical axis, cannot be ignored in short-distance imaging (imaging condition with high magnification). For example, imaging an object as close as 20 cm or imaging at an object distance of about 1 m and using an imaging optical system with a very long focal length (e.g., 400 mm) needs to actively correct the shift shake. A difference in an image point moving amount between a central portion and a peripheral portion on an image that occurs during shift shake is different from an angular shake.

Japanese Patent No. 6410431 and Japanese Patent Laid-Open Publication No. 2010-096938 are silent about a configuration for simultaneously correcting image blurs that occur in a central portion and a peripheral portion of an image.

SUMMARY

A control apparatus according to one aspect of the embodiment for use in an imaging system that includes a first correcting member movable for image stabilization and provided to one of an image pickup apparatus and a lens apparatus detachably attachable to the image pickup apparatus, and a second correcting member movable for the image stabilization and provided to the other of the image pickup apparatus and the lens apparatus includes a memory storing instructions, and a processor configured to execute the instructions to acquire first correction ratios of the first correcting member and the second correcting member for angular shake of the imaging system, and acquire second correction ratios of the first correcting member and the second correcting member for shift shake of the imaging system. An image pickup apparatus, a lens apparatus, and an imaging system each including the above control apparatus also constitute another aspect of the embodiment. A control method corresponding to the above control apparatus also constitutes another aspect of the embodiment.

Further features of the disclosure will become apparent from the following description of embodiments with reference to the attached drawings.

DESCRIPTION OF THE EMBODIMENTS

Figure 1:
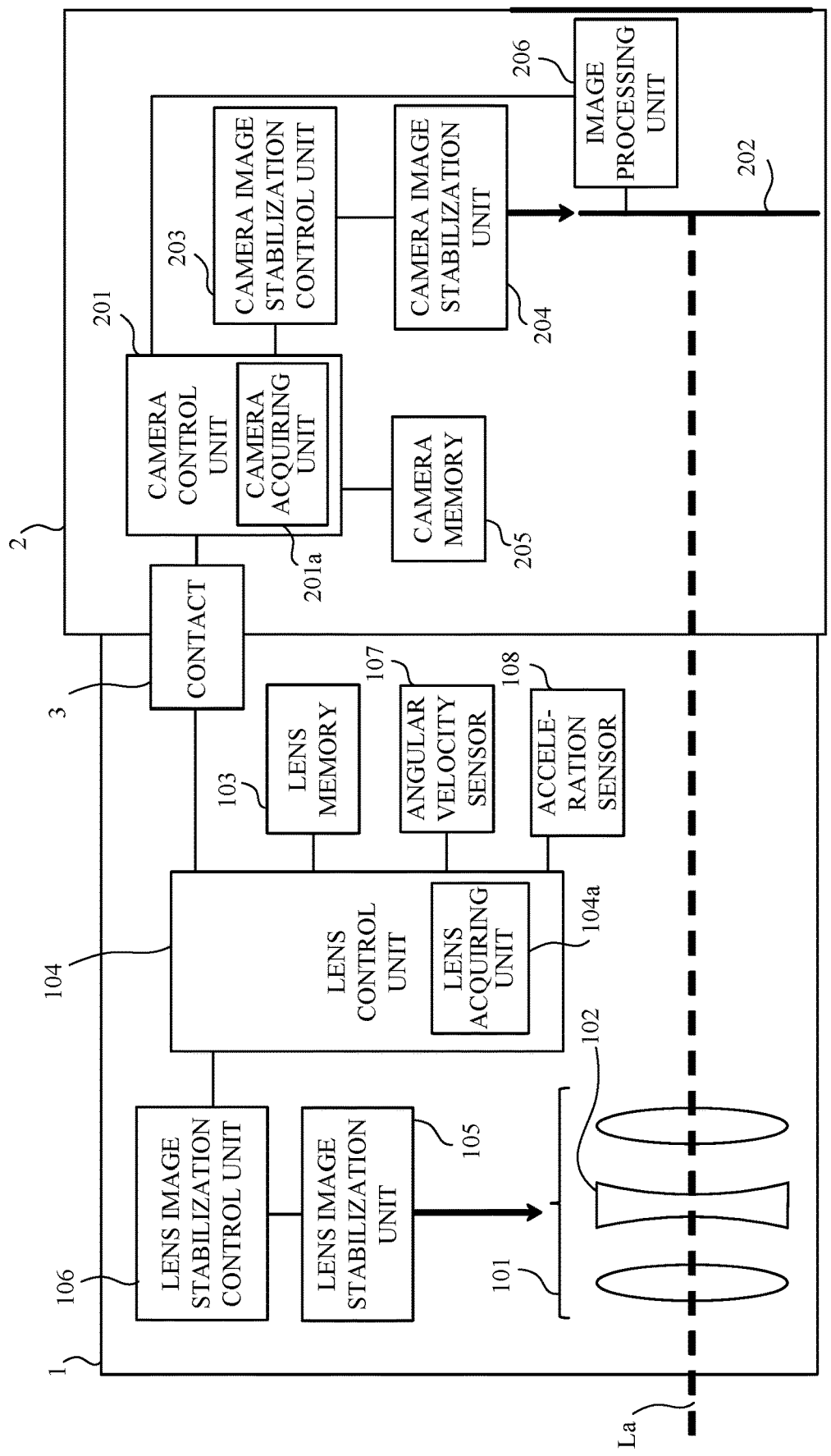
FIG. 1 is a configuration diagram of a digital camera as an example of a camera system according to one embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

FIG. 1 is a configuration diagram of a digital camera that is an example of a camera system (imaging system) according to this embodiment. The digital camera is a lens interchangeable type camera and includes an interchangeable lens (lens apparatus) 1 and a camera body (image pickup apparatus) 2. The interchangeable lens 1 is detachably and communicatively attached to the camera body 2. The interchangeable lens 1 and the camera body 2 are electrically connected by an electrical contact 3 and communicate information and share power via the electrical contact 3.

The interchangeable lens 1 includes an imaging optical system 101, a lens memory 103, a lens control unit 104, a lens image stabilization unit 105, a lens image stabilization control unit 106, an angular velocity sensor 107, and an acceleration sensor 108. An imaging optical system 101 includes a plurality of lenses including an image stabilization optical system 102. The lens control unit 104 includes a lens acquiring unit 104a.

The camera body 2 includes a camera control unit 201, an image sensor 202, a camera image stabilization control unit 203, a camera image stabilization unit 204, a camera memory 205, and an image processing unit 206. The camera control unit 201 includes a camera acquiring unit 201a.

A light ray from an imaging angle of view centered on an optical axis La of the imaging optical system 101 is transmitted through the imaging optical system 101 and forms an object image on the image sensor 202. The object image is photoelectrically converted by a photoelectric conversion unit (not illustrated) of the image sensor 202 and transmitted as an electric signal to the image processing unit 206. The image processing unit 206 converts the electrical signal from the image sensor 202 into image data in an image file format by developing processing, gamma processing, or the like. The image data is stored in an unillustrated nonvolatile memory by the camera control unit 201.

The image sensor 202 is movable by the camera image stabilization unit 204 in a direction including a directional component orthogonal to the optical axis La. The camera image stabilization unit 204 includes a support unit that supports the image sensor 202, and an actuator that moves the image sensor 202 in the direction including the directional component orthogonal to the optical axis La. The camera image stabilization control unit 203 performs camera-side image stabilization by controlling a camera image stabilization unit 204 based on an instruction from the camera control unit 201.

The image stabilization optical system 102 can be moved in the direction including the directional component orthogonal to the optical axis La by the lens image stabilization unit 105. The lens image stabilization unit 105 includes a support unit that supports the image stabilization optical system 102, and an actuator that moves the image stabilization optical system 102 in the direction including the directional component orthogonal to the optical axis La. The lens image stabilization control unit 106 performs lens-side image stabilization by controlling the lens image stabilization unit 105 based on an instruction from the lens control unit 104.

The camera control unit 201 and the lens control unit 104 communicate with each other via the electrical contact 3 and perform driving control using the camera image stabilization unit 204 and the lens image stabilization unit 105 to reduce unnecessary vibrations applied to the digital camera. In this embodiment, one of the image sensor 202 moved by the camera image stabilization unit 204 and the image stabilization optical system 102 moved by the lens image stabilization unit 105 functions as a first correcting member, and the other functions as a second correcting member.

In this embodiment, the lens control unit 104 controls the lens image stabilization unit 105 via the lens image stabilization control unit 106, and controls the camera image stabilization unit 204 via the camera control unit 201 and the camera image stabilization control unit 203. Although image stabilization of the entire digital camera is controlled by such control, the present disclosure is not limited to this embodiment. The camera control unit 201 may control the overall image stabilization by controlling the camera image stabilization unit 204 via the camera image stabilization control unit 203, and by controlling the lens image stabilization unit 105 via the lens control unit 104 and the lens image stabilization control unit 106.

The lens acquiring unit 104a acquires information about lens-side and camera-side image stabilization residue amounts, and the lens shake correction sensitivity. The lens control unit 104 determines correction ratios of the two image stabilization units using the information acquired by the lens acquiring unit 104a, and controls at least one of the two image stabilization units based on the correction ratios. More specifically, the lens control unit 104 functions as a first acquiring unit configured to acquire correction ratios (first correction ratios) of the two image stabilization units for the angular shake, that is, the two correcting members using the information acquired by the lens acquiring unit 104a. The lens control unit 104 also functions as a second acquiring unit configured to acquire correction ratios (second correction ratios) of the two correcting members for the shift shake using the information acquired by the lens acquiring unit 104a. The lens control unit 104 functions as a control unit configured to correct angular shake by moving at least one of the two correcting members using the first correction ratios, and to correct shift shake by moving at least one of the two correcting members using the second correction ratios. The lens control unit 104 may be configured as a control apparatus separate from the interchangeable lens 1 and the camera body 2. The camera control unit 201 may have the above functions of the lens control unit 104.

The angular velocity sensor 107 is a vibrating gyro or the like that uses the Coriolis force, and detects the angular shake of the digital camera. The acceleration sensor 108 detects acceleration associated with shift (translation) of the digital camera. The lens control unit 104 can detect shift shake (parallel shake) applied to the digital camera using the angular shake detected by the angular velocity sensor 107 and the acceleration detected by the acceleration sensor 108. Angular shake and shift shake may be detected using a method different from the above method.

In this embodiment, the camera image stabilization unit 204 performs camera-side image stabilization by moving the image sensor 202, but the present disclosure is not limited to this embodiment. The camera image stabilization unit 204 may perform camera-side image stabilization by changing a cutting position of an object image formed on the image sensor 202.

The lens control unit 104 drives and controls a variety of actuators via various unillustrated control units according to instructions given from the camera body 2. For example, according to the object focus detection information and photometry information obtained by the image processing unit 206, the lens control unit 104 can drive and control a focusing unit and an aperture unit (not illustrated) via a focusing control unit and aperture control unit (not illustrated) and adjust an imaging state of the object image and an aperture state.

First Embodiment

Image stabilization performed by the digital camera according to this embodiment determines driving amounts of two image stabilization units based on the information stored in the lens memory 103 and the like while the lens control unit 104 communicates with the camera control unit 201 via the electrical contact 3.

The lens memory 103 stores an angular shake correction angle relative to a moving amount of the image stabilization optical system 102, that is, lens angular shake correction sensitivity Ltv, and a shift shake correction amount relative to a moving amount of the image stabilization optical system 102, that is, lens shift shake correction sensitivity Lsv. The lens memory 103 stores an angular shake correction angle relative to a moving amount of the image sensor 202, that is, camera angular shake correction sensitivity Ctv, and a shift shake correction amount relative to a moving amount of the image sensor 202, that is, camera shift shake correction sensitivity Csv.

The lens memory 103 stores an image stabilization residue amount (lens peripheral angular shake correction residue amount Ltd) of a peripheral portion in a case where the digital camera is rotated by a predetermined angle in the pitch or yaw direction and a central portion of an image is image-stabilized by the lens-side image stabilization. The lens memory 103 stores an image stabilization residue amount (camera peripheral angular shake correction residue amount Ctd) of the peripheral portion in a case where the digital camera is rotated by a predetermined angle in the pitch or yaw direction and the central portion of the image is image-stabilized by the camera-side image stabilization.

The lens memory 103 stores an image stabilization residue amount (lens peripheral shift shake correction residue amount Lsd) of the peripheral portion in a case where the digital camera is shifted by a predetermined amount in the direction orthogonal to the optical axis La and in the central portion of the image is image-stabilized by the lens-side image stabilization. The lens memory 103 stores an image stabilization residue amount (camera peripheral shift shake correction residue amount Ctd) of the peripheral portion in a case where the digital camera is shifted by a predetermined amount in the direction orthogonal to the optical axis La and the central portion of the image is image-stabilized by the camera-side image stabilization.

Information stored in the lens memory 103 is referred to by the lens control unit 104 and the camera control unit 201.

Figure 2:
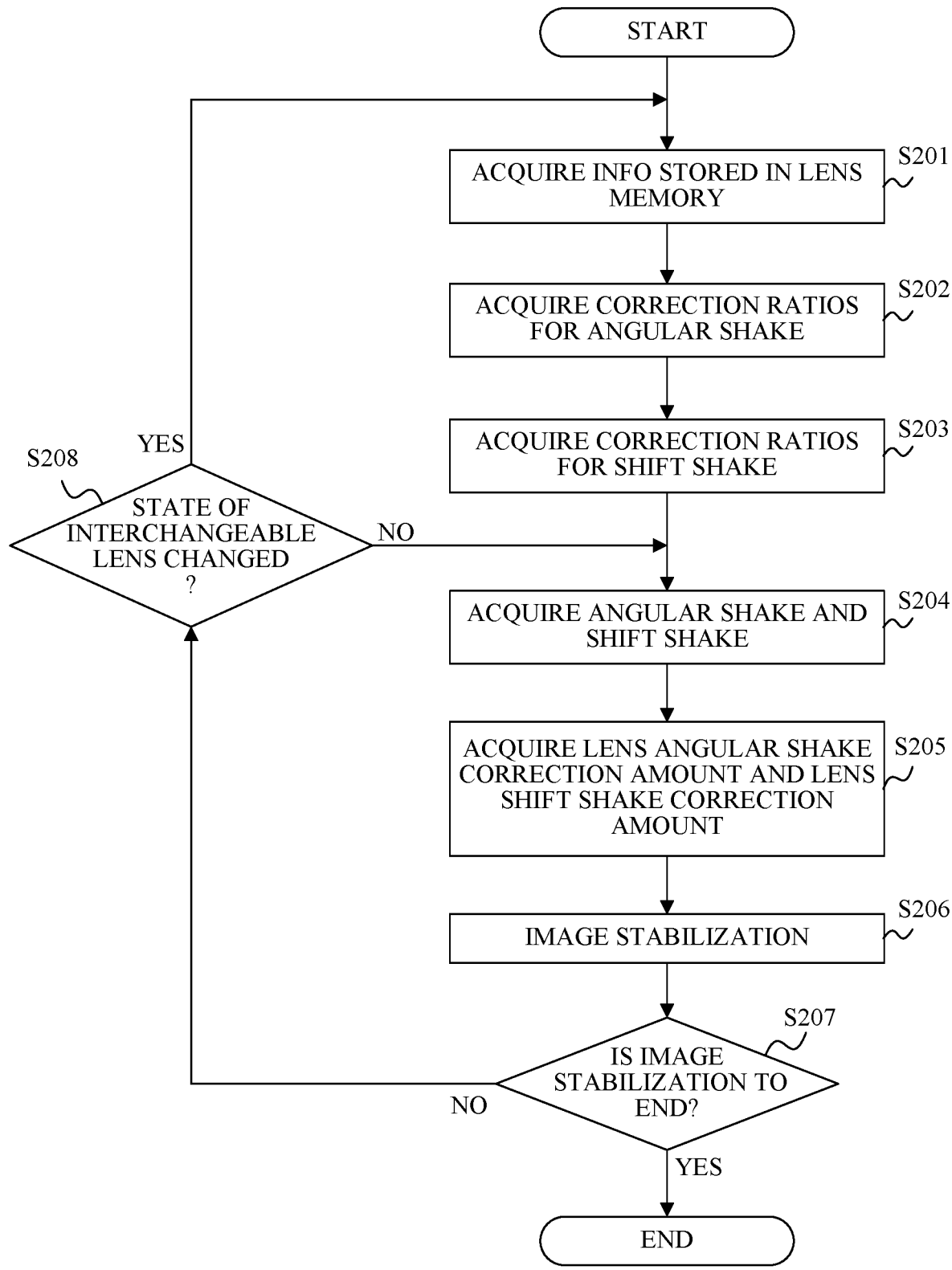
FIG. 2 is a flowchart illustrating image stabilization performed by an interchangeable lens according to a first embodiment.

A description will now be given of image stabilization according to this embodiment. FIG. 2 is a flowchart illustrating the image stabilization performed by the interchangeable lens 1 according to this embodiment. The flow in FIG. 2 is started when the digital camera is powered on or returns from a sleep mode.

In step S201, the lens control unit 104 acquires information stored in the lens memory 103. The information stored in the lens memory 103 includes the lens angular shake correction sensitivity Ltv, lens shift shake correction sensitivity Lsv, camera angular shake correction sensitivity Ctv, camera shift shake correction sensitivity Csv, lens peripheral angular shake correction residue amount Ltd, camera peripheral angular shake correction residue amount Ctd, lens peripheral shift shake correction residue amount Lsd, and camera peripheral shift shake correction residue amount Ctd. The information stored in the lens memory 103 changes depending on the zoom state and a focus state of the imaging optical system 101, so the information is stored for each of the zoom state and focus state.

The lens angular shake correction sensitivity Ltv is an angular shake correction angle in a case where the image stabilization optical system 102 is moved by a predetermined amount. The lens shift shake correction sensitivity Lsv is a shift shake correction amount in a case where the image stabilization optical system 102 is moved by a predetermined amount.

The camera angular shake correction sensitivity Ctv is an angular shake correction angle in a case where the image sensor 202 is moved by a predetermined amount. The camera shift shake correction sensitivity Csv is a shift shake correction amount in a case where the image sensor 202 is moved by a predetermined amount.

The camera image stabilization sensitivity Cv, which includes the camera angular shake correction sensitivity Ctv and the camera shift shake correction sensitivity Csv, can also be obtained from a rear principal point position of the imaging optical system 101 and thus the lens memory 103 may store the rear principal point position of the imaging optical system 101. In this case, the lens acquiring unit 104a acquires the rear principal point position, and the lens control unit 104 acquires the camera image stabilization sensitivity Cv. Alternatively, the camera acquiring unit 201a may acquire the rear principal point position of the imaging optical system 101, and the camera control unit 201 may acquire the camera image stabilization sensitivity Cv.

The lens peripheral angular shake correction residue amount Ltd is an image stabilization residue amount of the peripheral portion (at a predetermined image height) in a case where the digital camera is rotated by a predetermined angle and the central portion of the image is image-stabilized by the lens-side image stabilization. The predetermined image height is an image height other than a position on the optical axis (off-axis image height). The lens peripheral angular shake correction residue amount Ltd may be obtained from an image point moving amount in the central portion of an image, an image point moving amount at a predetermined image height, and an angular shake correction angle, in a case where the image stabilization optical system 102 is moved by a predetermined amount. The lens peripheral angular shake correction residue amount Ltd may be a coefficient of a function that indicates a change for each image height of an image stabilization residue amount of the peripheral portion in a case where the digital camera is rotated by a predetermined angle and the central portion of the image is image-stabilized by the lens-side image stabilization.

The camera peripheral angular shake correction residue amount Ctd is an image stabilization residue amount of a peripheral portion (at a predetermined image height) in a case where the digital camera is rotated by a predetermined angle and the central portion of the image is image-stabilized by the camera-side image stabilization. The predetermined image height is an image height other than a position on the optical axis (off-axis image height). The camera peripheral angular shake correction residue amount Ctd may be obtained from an image point moving amount in a central portion of an image and an image point moving amount at a predetermined image height, in a case where the digital camera is rotated by a predetermined angle. The camera peripheral angular shake correction residue amount Ctd may be a coefficient of a function that indicates a change for each image height of an image stabilization residue amount of the peripheral portion in a case where the digital camera is rotated by a predetermined angle and the central portion of the image is image-stabilized by the camera-side image stabilization.

Figure 3A:
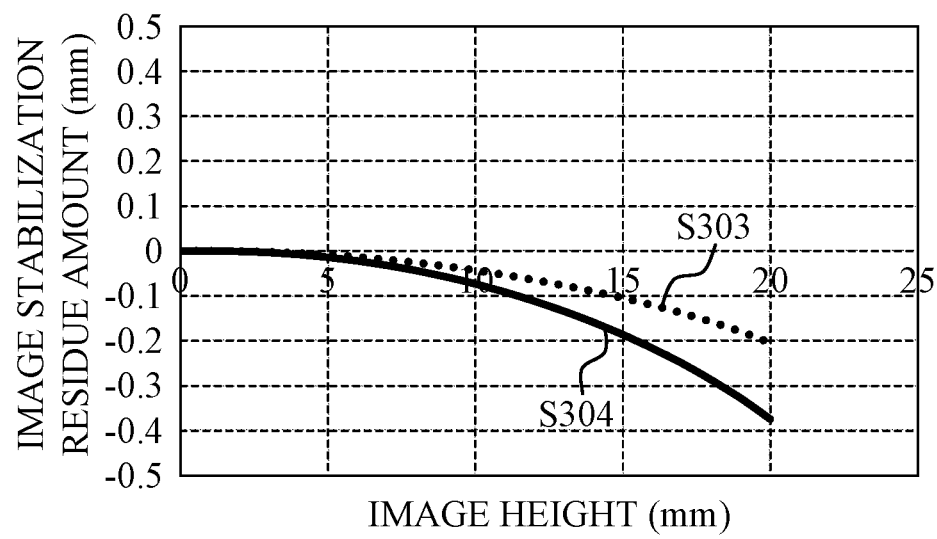
FIGS. 3A and 3B explain a lens peripheral angular shake correction residue amount of and a camera peripheral angular shake correction residue amount.

FIG. 3A explains the lens peripheral angular shake correction residue amount Ltd and the camera peripheral angular shake correction residue amount Ctd. The lens peripheral angular shake correction residue amount Ltd and the camera peripheral angular shake correction residue amount Ctd are illustrated by curves S303 and S304, respectively. As illustrated in FIG. 3A, even if the image stabilization residue amount in the central portion of the image (image height 0) is corrected to 0, it does not become 0 at other image heights. An image stabilization residue amount for the lens-side image stabilization and an image stabilization residue amount for the camera-side image stabilization have different amounts. The lens peripheral angular shake correction residue amount Ltd may be stored as a function of the image height, or may be stored as a value for each predetermined image height. The camera peripheral angular shake correction residue amount Ctd may be stored as a function of the image height, or may be stored as a value for each predetermined image height.

The lens peripheral shift shake correction residue amount Lsd is an image stabilization residue amount of a peripheral portion (at a predetermined image height) in a case where the digital camera is shifted by a predetermined amount in the direction orthogonal to the optical axis La and the central portion of the image is image-stabilized by the lens-side image stabilization. The predetermined image height is an image height other than a position on the optical axis (off-axis image height). The lens peripheral shift shake correction residue amount Lsd is obtained from an image point shift amount in the central portion of the image, an image point shift amount at a predetermined image height, and a shift shake correction amount, in a case where the image stabilization optical system 102 is moved by a predetermined amount. The lens peripheral shift shake correction residue amount Lsd may be a coefficient of a function that indicates a change for each image height of an image stabilization residue amount of a peripheral portion in a case where the digital camera is shifted by a predetermined amount in the direction orthogonal to the optical axis La and the central portion of the image is image-stabilized by the lens-side image stabilization.

The camera peripheral shift shake correction residue amount Csd is an image stabilization residue amount of a peripheral portion (at a predetermined image height) in a case where the digital camera is shifted by a predetermined amount in the direction orthogonal to the optical axis La and the central portion of the image is image-stabilized by the camera-side image stabilization. The predetermined image height is an image height other than a position on the optical axis (off-axis image height). The camera peripheral shift shake correction residue amount Csd may be obtained from an image point moving amount in the central portion of an image, an image point moving amount at a predetermined image height, and a shift shake correction amount, in a case where the digital camera is shifted by a predetermined amount in the direction orthogonal to the optical axis La. The camera peripheral shift shake correction residue amount Csd may be a coefficient of a function that indicates a change for each image height of an image stabilization residue amount of a peripheral portion in a case where the digital camera is shifted by a predetermined amount in the direction orthogonal to the optical axis La and the central portion of the image is image-stabilized by the camera-side image stabilization.

Figure 3B:
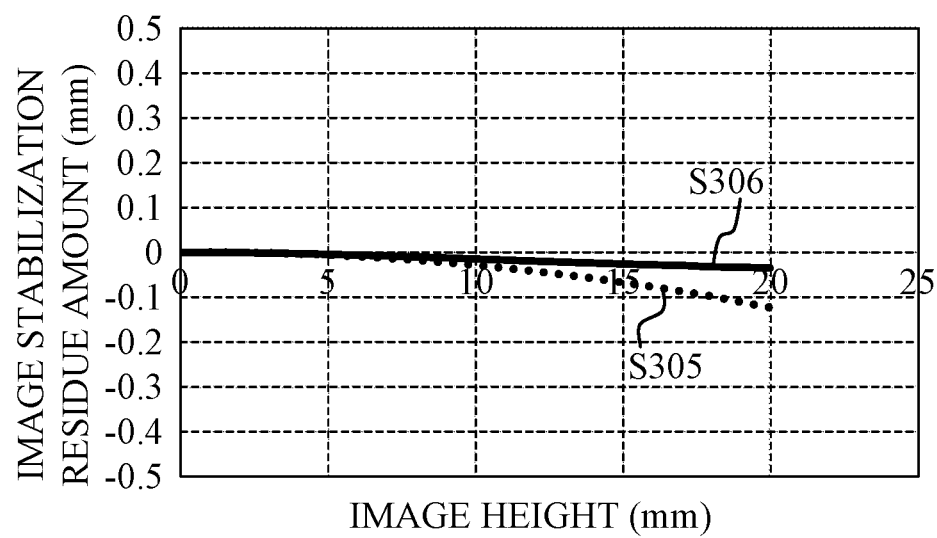

FIG. 3B explains the lens peripheral shift shake correction residue amount Lsd and the camera peripheral shift shake correction residue amount Csd. The lens peripheral shift shake correction residue amount Lsd and the camera peripheral shift shake correction residue amount Csd are illustrated by curves S305 and S306, respectively. As illustrated in FIG. 3B, even if the image stabilization residue amount in the central portion of the image (image height 0) is corrected to 0, it does not become 0 at other image heights. An image stabilization residue amount for the lens-side image stabilization and an image stabilization residue amount for the camera-side image stabilization have different values. The lens peripheral shift shake correction residue amount Lsd may be stored as a function of the image height, or may be stored as a value for each predetermined image height. The camera peripheral shift shake correction residue amount Csd may be stored as a function of the image height, or may be stored as a value for each predetermined image height.

In step S202, the lens control unit 104 acquires the correction ratios (first correction ratios) of the lens-side image stabilization and the camera-side image stabilization for angular shake using the lens peripheral angular shake correction residue amount Ltd and the camera peripheral angular shake correction residue amount Ctd.

A description will now be given of a specific method of acquiring the correction ratios for angular shake. The lens control unit 104 acquires the correction ratio for the lens-side image stabilization for angular shake (lens angular shake correction ratio Ltk) and the correction ratio for the camera-side image stabilization for angular shake (camera angular shake correction ratio Ctk) using the following equations (1) and (2):

$$Ltk = \frac{Ctd - Bt}{Ctd - Ltd} \quad (1)$$

$$Ctk = \frac{Bt - Ltd}{Ctd - Ltd} \quad (2)$$

Bt is an image stabilization residue amount of the peripheral portion that is finally generated in a case where the lens image stabilization unit 105 and the camera image stabilization unit 204 perform angular shake corrections by predetermined angles, and may be 0 or may be set to a predetermined value according to the image stabilization residue amount to the entire image.

Although the lens angular shake correction ratio Ltk and the camera angular shake correction ratio Ctk are calculated by the lens control unit 104 in this embodiment, they may be stored in the lens memory 103. One of the lens angular shake correction ratio Ltk and the camera angular shake correction ratio Ctk may be 0.

In step S203, the lens control unit 104 acquires the correction ratios (second correction ratios) of the lens-side image stabilization and the camera-side image stabilization for the shift shake using the lens peripheral shift shake correction residue amount Lsd and the camera peripheral shift shake correction residue amount Csd.

A description will now be given of a specific method of acquiring the correction ratios for the shift shake. The lens control unit 104 acquires the correction ratio for the lens-side image stabilization for shift shake (lens shift shake correction ratio Lsk) and the correction ratio for the camera-side image stabilization (the camera shift shake correction ratio Csk) for shift shake using the following equations (3) and (4):

$$Lsk = \frac{Csd - Bs}{Csd - Lsd} \quad (3)$$

$$Csk = \frac{Bs - Lsd}{Csd - Lsd} \quad (4)$$

Bs is an image stabilization residue amount of the peripheral portion that is finally generated in a case where the lens image stabilization unit 105 and the camera image stabilization unit 204 perform shift shake corrections by predetermined amounts, and may be 0 or may be set to a predetermined amount according to the image stabilization residue amount to the entire image.

Although the lens shift shake correction ratio Lsk and the camera shift shake correction ratio Csk are calculated by the lens control unit 104 in this embodiment, they may be stored in the lens memory 103. One of the lens shift shake correction ratio Lsk and the camera shift shake correction ratio Csk may be 0.

In step S204, the lens control unit 104 acquires angular shake from the angular velocity sensor 107 and shift shake using the detection results of the angular velocity sensor 107 and the acceleration sensor 108.

In step S205, the lens control unit 104 acquires a lens angular shake correction amount, which is a driving amount of the lens image stabilization unit 105 for the angular shake, using the lens angular shake correction sensitivity Ltv, the lens angular shake correction ratio Ltk, and the angular shake. The lens control unit 104 acquires a lens shift shake correction amount, which is a driving amount of the lens image stabilization unit 105 for the shift shake, using the lens shift shake correction sensitivity Lsv, the lens shift shake correction ratio Lsk, and the shift shake.

A description will now be given of a method for acquiring the lens angular shake correction amount and the lens shift shake correction amount. In a case where the digital camera is rotated by an angle θ in a pitch or the yaw direction, the lens control unit 104 acquires a lens angular shake correction amount Ltt using the following equation (5). In a case where the digital camera is shifted by a shift amount S in the direction orthogonal to the optical axis La, the lens control unit 104 acquires the lens shift shake correction amount Lst using the following equation (6).

$$Ltt = \frac{\theta \times Ltk}{Ltv} \quad (5)$$

$$Lst = \frac{S \times Lsk}{Lsv} \quad (6)$$

In step S206, the lens control unit 104 drives the lens image stabilization unit 105 with a total value of the lens angular shake correction amount and the lens shift shake correction amount and corrects an image blur.

In step S207, the lens control unit 104 determines whether to end the image stabilization. In a case where the lens control unit 104 determines to end the image stabilization, this flow ends. In a case where it determines not to end the image stabilization, the processing of step S208 is executed.

In step S208, the lens control unit 104 determines whether the state of the interchangeable lens 1, such as the focus state and the zoom state, has changed. In a case where it is determined that the state of the interchangeable lens 1 has changed, the lens control unit 104 executes the processing of step S201, and in a case where it is determined that the state of the interchangeable lens 1 has not changed, the processing of step S204 is executed.

Figure 4:
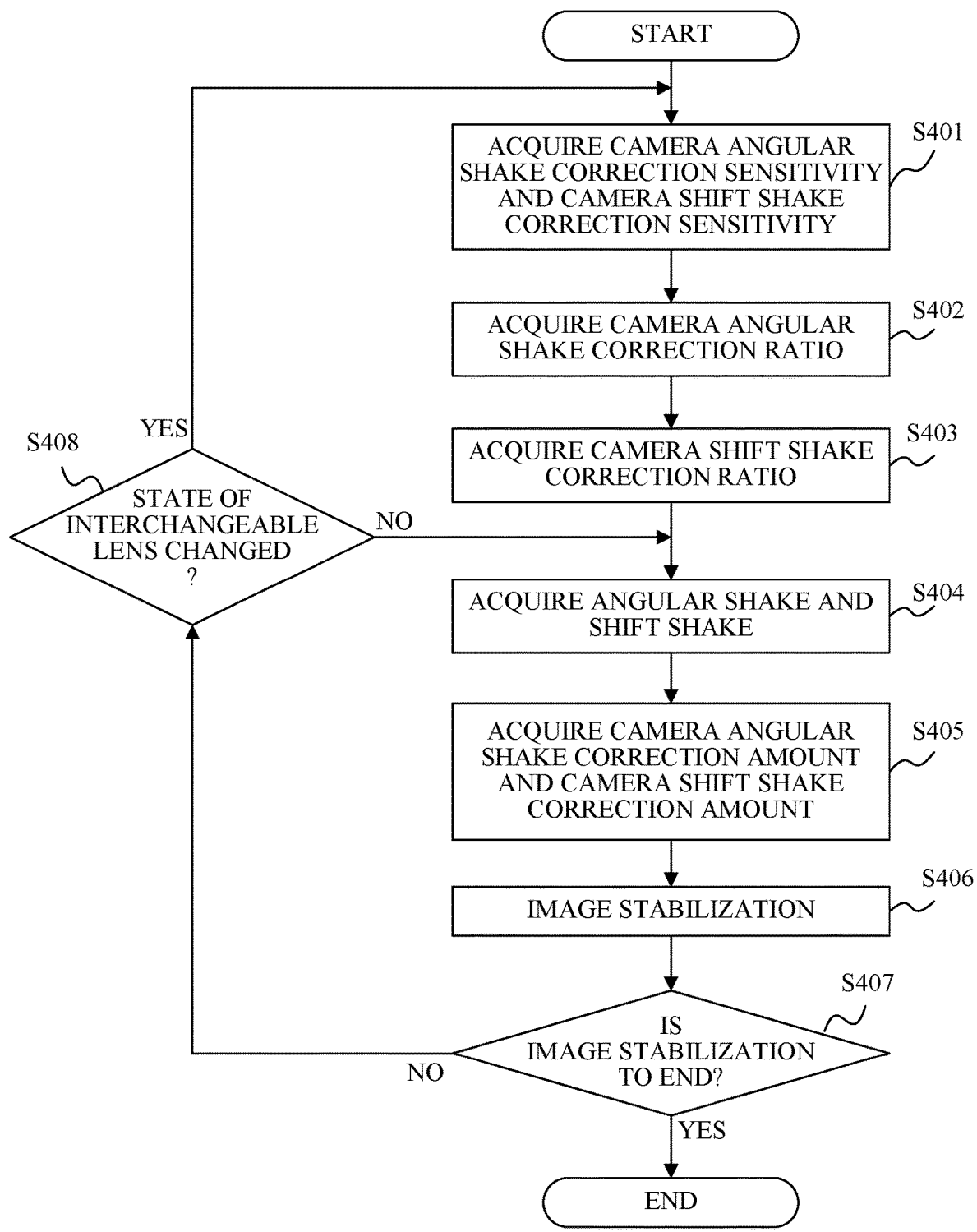
FIG. 4 is a flowchart illustrating image stabilization performed by a camera body according to each of the first and third embodiments.

FIG. 4 is a flowchart illustrating image stabilization performed by the camera body 2 according to this embodiment. The flow in FIG. 4 is started when the digital camera is powered on or returns from a sleep mode.

In step S401, the camera control unit 201 acquires the camera angular shake correction sensitivity Ctv and the camera shift shake correction sensitivity Csv via the electrical contact 3 and the lens control unit 104.

In step S402, the camera control unit 201 acquires the camera angular shake correction ratio Ctk via the electrical contact 3 and the lens control unit 104.

In step S403, the camera control unit 201 acquires the camera shift shake correction ratio Csk via the electrical contact 3 and the lens control unit 104.

In step S404, the camera control unit 201 acquires angular shake and shift shake via the electrical contact 3 and the lens control unit 104.

In step S405, the camera control unit 201 acquires the camera angular shake correction amount, which is a driving amount of the camera image stabilization unit 204 for angular shake, using the camera angular shake correction sensitivity Ctv, the camera angular shake correction ratio Ctk, and the angular shake. The camera control unit 201 acquires the camera shift shake correction amount, which is a driving amount of the camera image stabilization unit 204 for shift shake, using the camera shift shake correction sensitivity Csv, the camera shift shake correction ratio Csk, and the shift shake.

A description will now be given of a method for acquiring the camera angular shake correction amount and the camera shift shake correction amount. In a case where the digital camera is rotated by an angle θ in the pitch or yaw direction, the camera control unit 201 acquires the camera angular shake correction amount Ctt using the following equation (7). In a case where the digital camera is shifted in the direction orthogonal to the optical axis La by a shift amount S, the camera control unit 201 acquires the camera shift shake correction amount Cst using the following equation (8):

$$Ctt = \frac{\theta \times Ctk}{Ctv} \quad (7)$$

$$Cst = \frac{S \times Csk}{Csv} \quad (8)$$

In step S406, the camera control unit 201 drives the camera image stabilization unit 204 with a total value of the camera angular shake correction amount and the camera shift shake correction amount and corrects an image blur.

In step S407, the camera control unit 201 determines whether to end image stabilization. In a case where the camera control unit 201 determines to end the image stabilization, this flow ends. In a case where it determines not to end the image stabilization, the processing of step S408 is executed.

In step S408, the camera control unit 201 determines whether the state of the interchangeable lens 1, such as the focus state and the zoom state, has changed. In a case where the camera control unit 201 determines that the state of the interchangeable lens 1 has changed, the processing of step S401 is executed, and in a case where it determines that the state of the interchangeable lens 1 has not changed, the processing of step S404 is executed.

The correction amount of the lens-side image stabilizing member and the correction amount of the camera-side image stabilizing unit regarding angular shake and shift shake may be acquired using the correction ratio (Ltk/Ctk) of the correcting member of the camera-side image stabilizing unit to the lens-side image stabilizing member regarding angular shake, the correction ratio (Lsk/Csk) of the correcting member of the camera-side image stabilizing unit to the lens-side image stabilizing member regarding shift shake, the lens shift shake correction sensitivity Lsv, and camera shift shake correction sensitivity Csv.

As described above, the configuration of this embodiment can suppress the influence of image blur remaining in the peripheral portion of the image.

Second Embodiment

In an imaging optical system that employs the central projection method, a difference in the image point moving amount between the central portion and the peripheral portion of the image for shift shake is smaller than a difference in the image point moving amount between the central portion and the peripheral portion of the image for angular shake. Therefore, camera-side image stabilization that uniformly corrects image points in the central portion and the peripheral portion is effective for shift shake. This embodiment corrects angular shake using the lens-side image stabilization and camera-side image stabilization, and corrects shift shake using the camera-side image stabilization. That is, the lens shift shake correction ratio Lsk is set to 0, and the camera shift shake correction ratio Csk is set to 1.

The image stabilization performed by the digital camera according to this embodiment determines driving amounts of the two image stabilization units based on the information stored in the lens memory 103 while the camera control unit 201 communicates with the lens control unit 104 via the electrical contact 3.

The lens memory 103 stores an angular shake correction angle relative to a moving amount of the image stabilization optical system 102, that is, the lens angular shake correction sensitivity Ltv. The lens memory 103 stores an angular shake correction angle relative to a moving amount of the image sensor 202, that is, the camera angular shake correction sensitivity Ctv, and a shift shake correction amount relative to a moving amount of the image sensor 202, that is, the camera shift shake correction sensitivity Csv.

The lens memory 103 stores an image stabilization residue amount (lens) peripheral angular shake correction residue amount Ltd) of a peripheral portion in a case where the digital camera is rotated by a predetermined angle in the pitch or yaw direction and a central portion of an image is image-stabilized by the lens-side image stabilization. The lens memory 103 stores an image stabilization residue amount (camera peripheral angular shake correction residue amount Ctd) of the peripheral portion in a case where the digital camera is rotated by a predetermined angle in the pitch or yaw direction and the central portion of the image is image-stabilized by the camera-side image stabilization.

Information stored in the lens memory 103 is referred to by the lens control unit 104 and the camera control unit 201.

Figure 5:
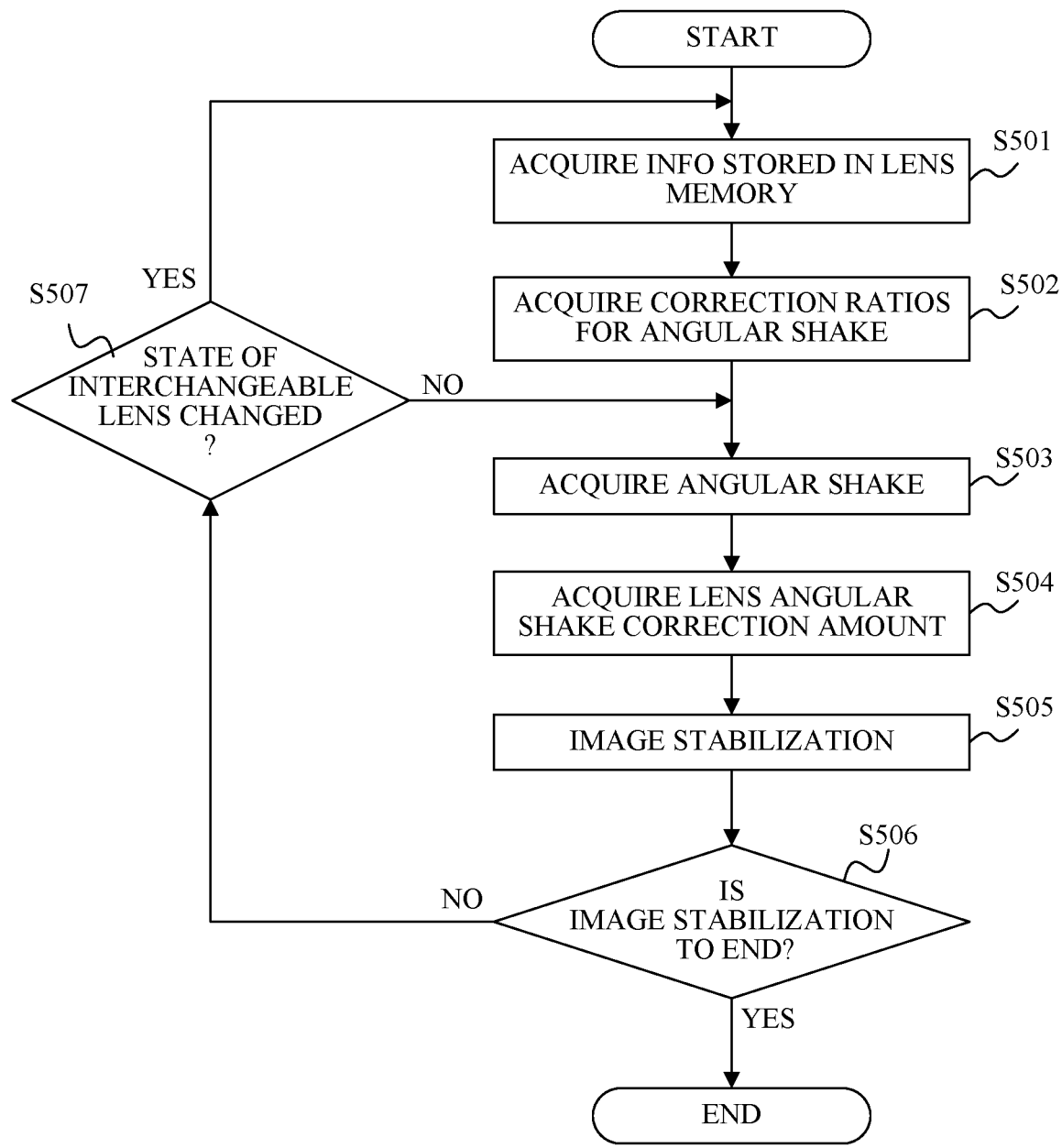
FIG. 5 is a flowchart illustrating image stabilization performed by an interchangeable lens according to a second embodiment.

A description will now be given of stabilization image according to this embodiment. FIG. 5 is a flowchart illustrating image stabilization performed by the interchangeable lens 1 according to this embodiment. The flow in FIG. 5 is started when the digital camera is powered on or returns from a sleep mode.

In step S501, the lens control unit 104 acquires information stored in the lens memory 103. The information stored in the lens memory 103 includes the lens angular shake correction sensitivity Ltv, camera angular shake correction sensitivity Ctv, camera shift shake correction sensitivity Csv, lens peripheral angular shake correction residue amount Ltd, and camera peripheral angular shake correction residue amount Ctd. The information stored in the lens memory 103 changes depending on the zoom state and focus state of the imaging optical system 101, so the information is stored for each of the zoom state and focus state.

The lens angular shake correction sensitivity Ltv is an angular shake correction angle in a case where the image stabilization optical system 102 is moved by a predetermined amount.

The camera angular shake correction sensitivity Ctv is an angular shake correction angle in a case where the image sensor 202 is moved by a predetermined amount. The camera shift shake correction sensitivity Csv is a shift shake correction amount in a case where the image sensor 202 is moved by a predetermined amount.

The camera image stabilization sensitivity Cv, which includes the camera angular shake correction sensitivity Ctv and the camera shift shake correction sensitivity Csv, can also be obtained from a rear principal point position of the imaging optical system 101 and thus the lens memory 103 may store the rear principal point position of the imaging optical system 101. In this case, the lens acquiring unit 104a acquires the rear principal point position, and the lens control unit 104 acquires the camera image stabilization sensitivity Cv. Alternatively, the camera acquiring unit 201a may acquire the rear principal point position of the imaging optical system 101, and the camera control unit 201 may acquire the camera image stabilization sensitivity Cv.

The lens peripheral angular shake correction residue amount Ltd is an image stabilization residue amount of the peripheral portion (at a predetermined image height) in a case where the digital camera is rotated by a predetermined angle and the central portion of the image is image-stabilized by the lens-side image stabilization. The predetermined image height is an image height other than a position on the optical axis (off-axis image height). The lens peripheral angular shake correction residue amount Ltd may be obtained from an image point moving amount in the central portion of an image, an image point moving amount at a predetermined image height, and an angular shake correction angle, in a case where the image stabilization optical system 102 is moved by a predetermined amount. The lens peripheral angular shake correction residue amount Ltd may be a coefficient of a function that indicates a change for each image height of an image stabilization residue amount of the peripheral portion in a case where the digital camera is rotated by a predetermined angle and the central area of the image is image-stabilized by the lens-side image stabilization.

The camera peripheral angular shake correction residue amount Ctd is an image stabilization residue amount of a peripheral portion (at a predetermined image height) in a case where the digital camera is rotated by a predetermined angle and the central portion of the image is image-stabilized by the camera-side image stabilization. The predetermined image height is an image height other than a position on the optical axis (off-axis image height). The camera peripheral angular shake correction residue amount Ctd may be obtained from an image point moving amount in a central portion of an image an image point moving amount at a predetermined image height, in a case where the digital camera is rotated by a predetermined angle. The camera peripheral angular shake correction residue amount Ctd may be a coefficient of a function that indicates a change for each image height of an image stabilization residue amount of the peripheral portion in a case where the digital camera is rotated by a predetermined angle and the central portion of the image is image-stabilized by the camera-side image stabilization.

In step S502, the lens control unit 104 acquires the correction ratios of the lens-side image stabilization and the camera-side image stabilization for the angular shake using the lens peripheral angular shake correction residue amount Ltd and the camera peripheral angular shake correction residue amount Ctd. More specifically, the lens control unit 104 acquires the correction ratio for the lens-side image stabilization for angular shake (lens angular shake correction ratio Ltk) and the correction ratio for the camera-side image stabilization for angular shake (the camera angular shake correction ratio Ctk) using a method similar to that of the first embodiment. Although the lens angular shake correction ratio Ltk and the camera angular shake correction ratio Ctk are calculated by the lens control unit 104 in this embodiment, they may be stored in the lens memory 103. One of the lens angular shake correction ratio Ltk and the camera angular shake correction ratio Ctk may be 0.

In step S503, the lens control unit 104 acquires angular shake from the angular velocity sensor 107.

In step S504, the lens control unit 104 acquires a lens angular shake correction amount, which is a driving amount of the lens image stabilization unit 105 for angular shake, using a method similar to that of the first embodiment, using the lens angular shake correction sensitivity Ltv, the lens angular shake correction ratio Ltk, and the angular shake.

In step S505, the lens control unit 104 drives the lens image stabilization unit 105 with the lens angular shake correction amount and corrects an image blur.

In step S506, the lens control unit 104 determines whether to end image stabilization. In a case where the lens control unit 104 determines to end the image stabilization, this flow ends. In a case where it determines not to end the image stabilization, the processing of step S507 is executed.

In step S507, the lens control unit 104 determines whether the state of the interchangeable lens 1, such as the focus state and the zoom state, has changed. In a case where the lens control unit 104 determines that the state of the interchangeable lens 1 has changed, the processing of step S501 is executed. In a case where it determines that the state of the interchangeable lens 1 has not changed, the processing of step S503 is executed.

Figure 6:
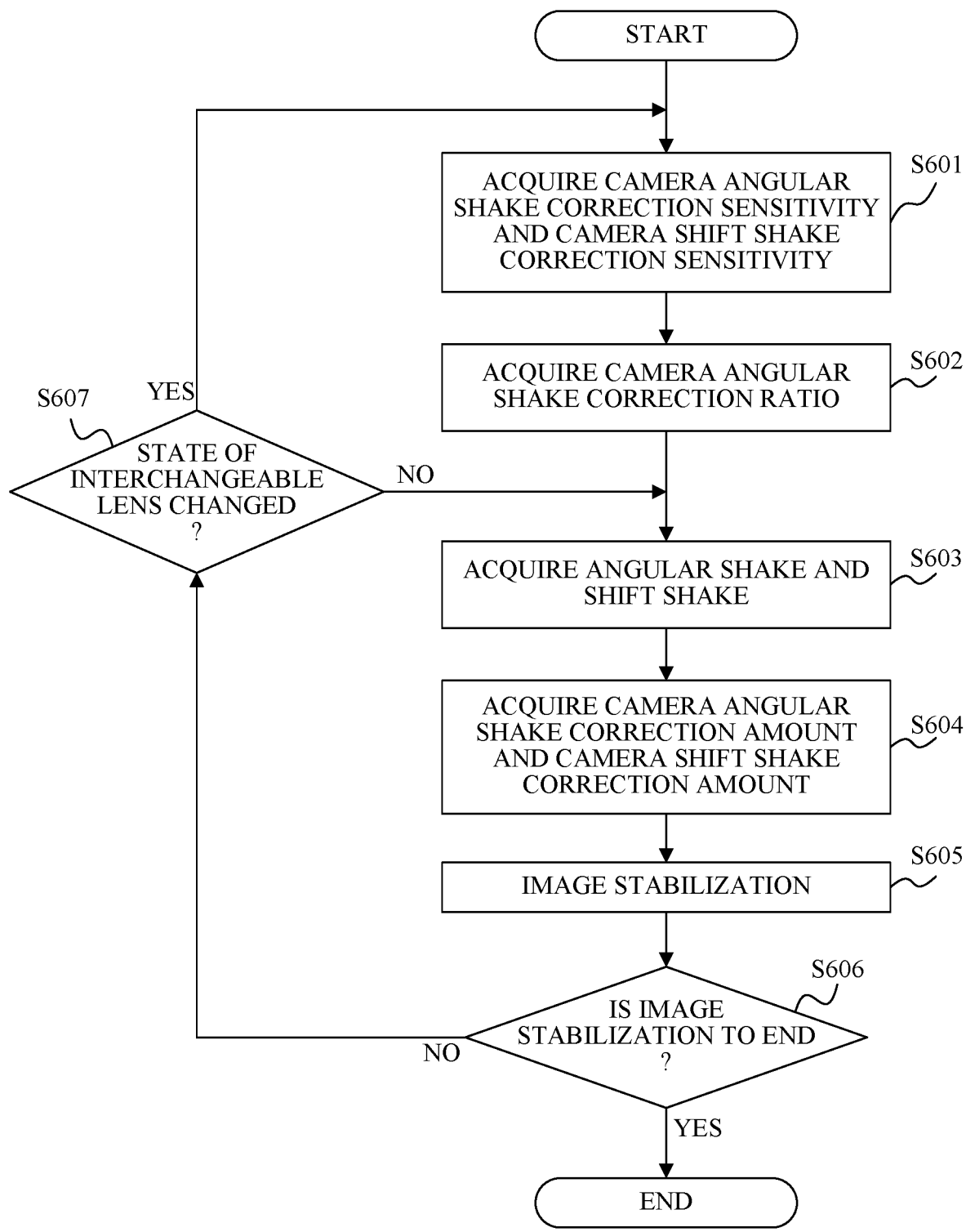
FIG. 6 is a flowchart illustrating image stabilization performed by a camera body according to the second embodiment.

FIG. 6 is a flowchart illustrating image stabilization performed by the camera body 2 according to this embodiment. The flow in FIG. 6 is started when the digital camera is powered on or returns from a sleep mode.

In step S601, the camera control unit 201 acquires the camera angular shake correction sensitivity Ctv and the camera shift shake correction sensitivity Csv via the electrical contact 3 and the lens control unit 104.

In step S602, the camera control unit 201 acquires the camera angular shake correction ratio Ctk via the electrical contact 3 and the lens control unit 104.

In step S603, the camera control unit 201 acquires angular shake and shift shake via the electrical contact 3 and the lens control unit 104.

In step S604, the camera control unit 201 acquires the camera angular shake correction amount, which is a driving amount of the camera image stabilization unit 204 for angular shake, using the camera angular shake correction sensitivity Ctv, the camera angular shake correction ratio Ctk, and the angular shake. The camera control unit 201 acquires the camera shift shake correction amount, which is a driving amount of the camera image stabilization unit 204 for shift shake, using the camera shift shake correction sensitivity Csv and the shift shake.

A description will now be given of a method for acquiring the camera angular shake correction amount and the camera shift shake correction amount. The camera control unit 201 acquires the camera angular shake correction amount Ctt by a method similar to that of the first embodiment. In a case where the digital camera is shifted in the direction orthogonal to the optical axis La by a shift amount S, the camera control unit 201 acquires the camera shift shake correction amount Cst using the following equation (9):

$$Cst = \frac{S}{Csv} \qquad (9)$$

In step S605, the camera control unit 201 drives the camera image stabilization unit 204 with a total value of the camera angular shake correction amount and the camera shift shake correction amount to correct an image blur.

In step S606, the camera control unit 201 determines whether to end image stabilization. In a case where the camera control unit 201 determines to end the image stabilization, this flow ends. In a case where it determines not to end the image stabilization, the processing of step S607 is executed.

In step S607, the camera control unit 201 determines whether the state of the interchangeable lens 1, such as the focus state and the zoom state, has changed. In a case where the camera control unit 201 determines that the state of the interchangeable lens 1 has changed, the processing of step S601 is executed, and in a case where it determines that the state of the interchangeable lens 1 has not changed, the processing of step S603 is executed.

As described above, the configuration of this embodiment can suppress the influence of image blur remaining in the peripheral portion of the image.

Third Embodiment

Image stabilization performed by the digital camera according to this embodiment determines driving amounts of two image stabilization units based on the information stored in the lens memory 103 while the camera control unit 201 communicates with the lens control unit 104 via the electrical contact 3.

The lens memory 103 stores an angular shake correction angle relative to the moving amount of the image stabilization optical system 102, that is, lens angular shake correction sensitivity Ltv, and a shift shake correction amount relative to a moving amount of the image stabilization optical system 102, that is, lens shift shake correction sensitivity Lsv. The lens memory 103 stores an angular shake correction angle relative to a moving amount of the image sensor 202, that is, camera angular shake correction sensitivity Ctv, and a shift shake correction amount relative to a moving amount of the image sensor 202, that is, camera shift shake correction sensitivity Csv.

The lens memory 103 stores an image stabilization residue amount (lens peripheral angular shake correction residue amount Ltd) of a peripheral portion in a case where the digital camera is rotated by a predetermined angle in a pitch or yaw direction and a central portion of an image is image-stabilized by the lens-side image stabilization. The lens memory 103 stores an image stabilization residue amount (camera peripheral angular shake correction residue amount Ctd) of the peripheral portion in a case where the digital camera is rotated by a predetermined angle in the pitch or yaw direction and the central portion of the image is image-stabilized by the camera-side image stabilization.

The lens memory 103 stores an image stabilization residue amount (lens peripheral shift shake correction residue amount Lsd) of the peripheral portion in a case where the digital camera is shifted by a predetermined amount in the direction orthogonal to the optical axis La and the central portion of the image is image-stabilized by the lens-side image stabilization. The lens memory 103 stores an image stabilization residue amount (camera peripheral shift shake correction residue amount Ctd) of the peripheral portion in a case where the digital camera is shifted by a predetermined amount in the direction orthogonal to the optical axis La and the central portion of the image is image-stabilized by the camera-side image stabilization.

The lens memory 103 stores an imaging magnification β of the imaging optical system 101.

Information stored in the lens memory 103 is referred to by the lens control unit 104 and the camera control unit 201.

Figure 7:
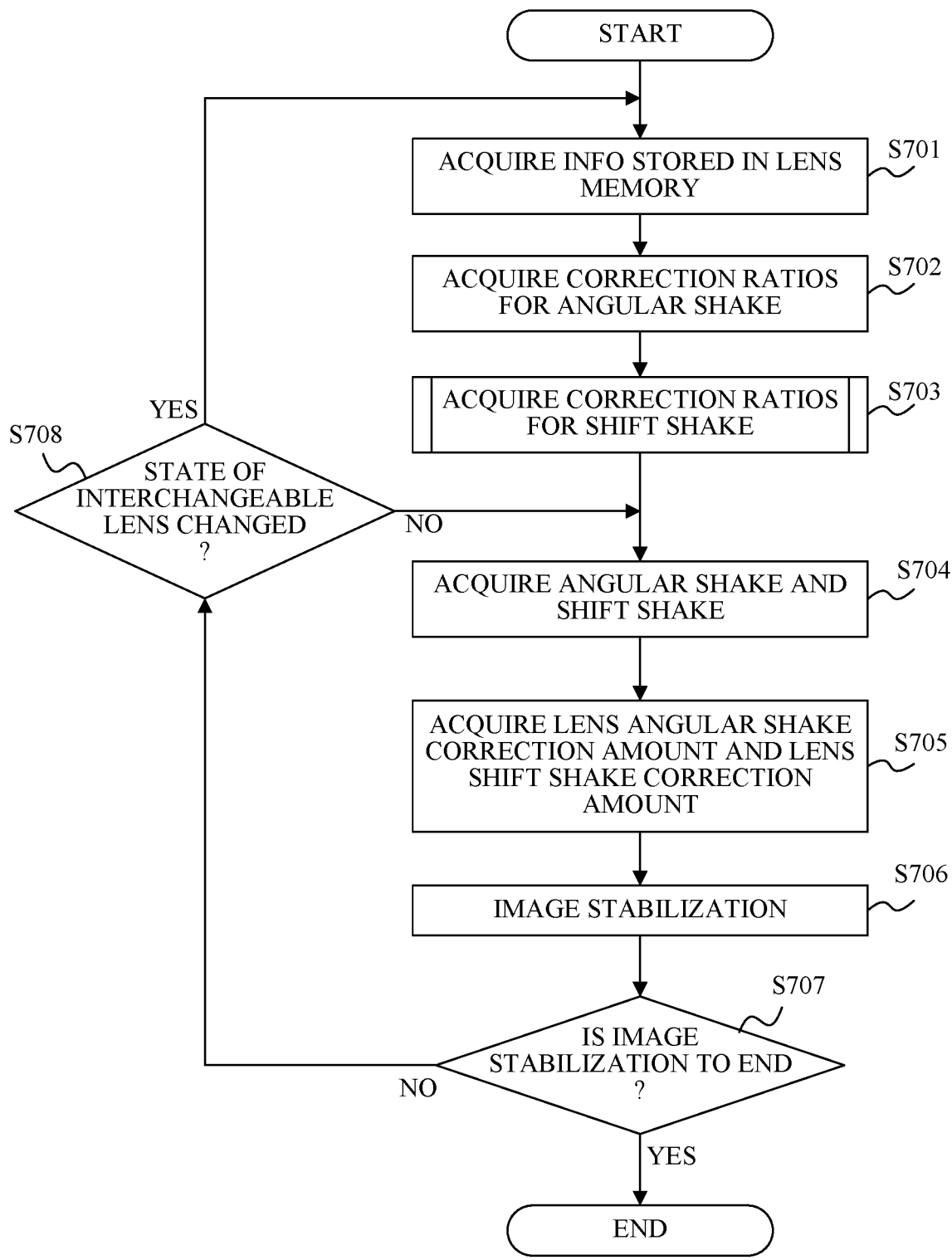
FIG. 7 is a flowchart illustrating image stabilization performed by an interchangeable lens according to the third embodiment.

A description will now be given of image stabilization according to this embodiment. FIG. 7 is a flowchart illustrating the image stabilization performed by the interchangeable lens 1 according to this embodiment. The flow in FIG. 7 is started when the digital camera is powered on or returns from a sleep state.

In step S701, the lens control unit 104 acquires information stored in the lens memory 103. The information stored in the lens memory 103 includes the lens angular shake correction sensitivity Ltv, lens shift shake correction sensitivity Lsv, camera angular shake correction sensitivity Ctv, camera shift shake correction sensitivity Csv, lens peripheral angular shake correction residue amount Ltd, camera peripheral angular shake correction residue amount Ctd, lens peripheral shift shake correction residue amount Lsd, camera peripheral shift shake correction residue amount Ctd, and imaging magnification β. The information stored in the lens memory 103 changes depending on the zoom state and a focus state of the imaging optical system 101, so the information is stored for each of the zoom state and focus state.

The lens angular shake correction sensitivity Ltv is an angular shake correction angle in a case where the image stabilization optical system 102 is moved by a predetermined amount. The lens shift shake correction sensitivity Lsv is a shift shake correction amount in a case where the image stabilization optical system 102 is moved by a predetermined amount.

The camera angular shake correction sensitivity Ctv is an angular shake correction angle in a case where the image sensor 202 is moved by a predetermined amount. The camera shift shake correction sensitivity Csv is a shift shake correction amount in a case where the image sensor 202 is moved by a predetermined amount.

The camera image stabilization sensitivity Cv, which includes the camera angular shake correction sensitivity Ctv and the camera shift shake correction sensitivity Csv, can also be obtained from a rear principal point position of the imaging optical system 101 and thus the lens memory 103 may store the rear principal point position of the imaging optical system 101. In this case, the lens acquiring unit 104a acquires the rear principal point position, and the lens control unit 104 acquires the camera image stabilization sensitivity Cv. Alternatively, the camera acquiring unit 201a may acquire the rear principal point position of the imaging optical system 101, and the camera control unit 201 may acquire the camera image stabilization sensitivity Cv.

The lens peripheral angular shake correction residue amount Ltd is an image stabilization residue amount of the peripheral portion (at a predetermined image height) in a case where the digital camera is rotated by a predetermined angle and the central portion of the image is image-stabilized by the lens-side image stabilization. The predetermined image height is an image height other than a position on the optical axis (off-axis image height). The lens peripheral angular shake correction residue amount Ltd may be obtained from an image point moving amount in the central portion of an image, an image point moving amount at a predetermined image height, and an angular shake correction angle, in a case where the image stabilization optical system 102 is moved by a predetermined amount. The lens peripheral angular shake correction residue amount Ltd may be a coefficient of a function that indicates a change for each image height of an image stabilization residue amount of the peripheral portion in a case where the digital camera is rotated by a predetermined angle and the central portion of the image is image-stabilized by the lens-side image stabilization.

The camera peripheral angular shake correction residue amount Ctd is an image stabilization residue amount of a peripheral portion (at a predetermined image height) in a case where the digital camera is rotated by a predetermined angle and the central portion of the image is image-stabilized by the camera-side image stabilization. The predetermined image height is an image height other than a position on the optical axis (off-axis image height). The camera peripheral angular shake correction residue amount Ctd may be obtained from an image point moving amount in a central portion of an image and an image point moving amount at a predetermined image height, in a case where the digital camera is rotated by a predetermined angle. The camera peripheral angular shake correction residue amount Ctd may be a coefficient of a function that indicates a change for each image height of an image stabilization residue amount of the peripheral portion in a case where the digital camera is rotated by a predetermined angle and the central portion of the image is image-stabilized by the camera-side image stabilization.

The lens peripheral shift shake correction residue amount Lsd is an image stabilization residue amount of a peripheral portion (at a predetermined image height) in a case where the digital camera is shifted by a predetermined amount in the direction orthogonal to the optical axis La and the central portion of the image is image-stabilized by the lens-side image stabilization. The predetermined image height is an image height other than a position on the optical axis (off-axis image height). The lens peripheral shift shake correction residue amount Lsd is obtained from an image point shift amount in the central portion of the image, an image point shift amount at a predetermined image height, and a shift shake correction amount, in a case where the image stabilization optical system 102 is moved by a predetermined amount. The lens peripheral shift shake correction residue amount Lsd may be a coefficient of a function that indicates a change for each image height of an image stabilization residue amount of a peripheral portion in a case where the digital camera is shifted by a predetermined amount in the direction orthogonal to the optical axis La and the central portion of the image is image-stabilized by the lens-side image stabilization.

The camera peripheral shift shake correction residue amount Csd is an image stabilization residue amount of a peripheral portion (at a predetermined image height) in a case where the digital camera is shifted by a predetermined amount in the direction orthogonal to the optical axis La and the central portion of the image is image-stabilized by the camera-side image stabilization. The predetermined image height is an image height other than a position on the optical axis (off-axis image height). The camera peripheral shift shake correction residue amount Csd may be obtained from an image point moving amount in the central portion of an image, an image point moving amount at a predetermined image height, and a shift shake correction amount, in a case where the digital camera is shifted by a predetermined amount in the direction orthogonal to the optical axis La. The camera peripheral shift shake correction residue amount Csd may be a coefficient of a function that indicates a change for each image height of an image stabilization residue amount of a peripheral portion in a case where the digital camera is shifted by a predetermined amount in the direction orthogonal to the optical axis La and the central portion of the image is image-stabilized by the camera-side image stabilization.

In step S702, the lens control unit 104 acquires the correction ratios of the lens-side image stabilization and the camera-side image stabilization for angular shake using the lens peripheral angular shake correction residue amount Ltd and the camera peripheral angular shake correction residue amount Ctd. More specifically, the lens control unit 104 acquires the correction ratio for the lens-side image stabilization for angular shake (lens angular shake correction ratio Ltk) and the correction ratio for the camera-side image stabilization for angular shake (camera angular shake correction ratio Ctk) using a method similar to that of the first embodiment.

In step S703, the lens control unit 104 acquires the correction ratios of lens-side image stabilization and camera-side image stabilization for shift shake using the lens peripheral shift shake correction residue amount Lsd and the camera peripheral shift shake correction residue amount Csd.

Figure 8:
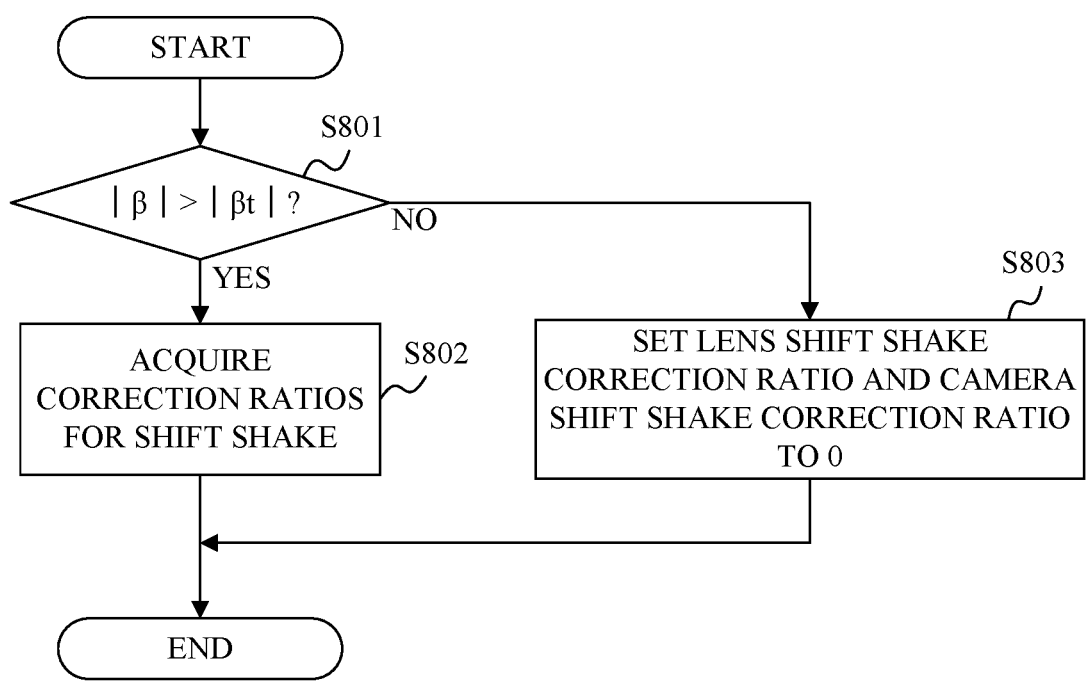
FIG. 8 is a flowchart illustrating a method of acquiring a correction ratio for shift shake according to the third embodiment.
Figure 9A:
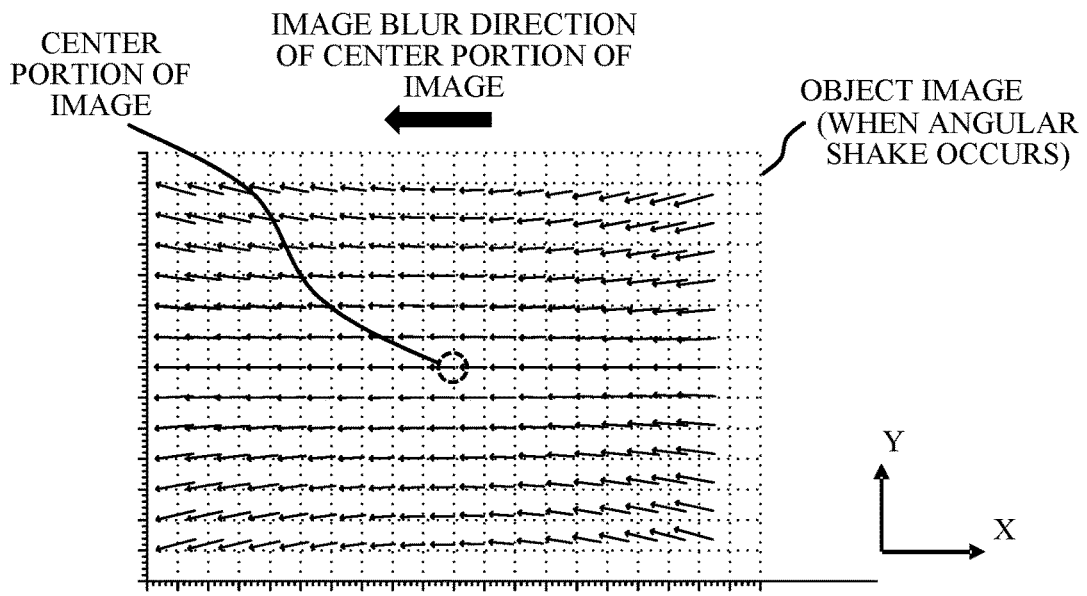
FIG. 9A illustrates the magnitude and direction of an image point moving amount at each image point on an object image in a case where image blur occurs in an −X direction at a central portion of the image due to angular shake.
Figure 9B:
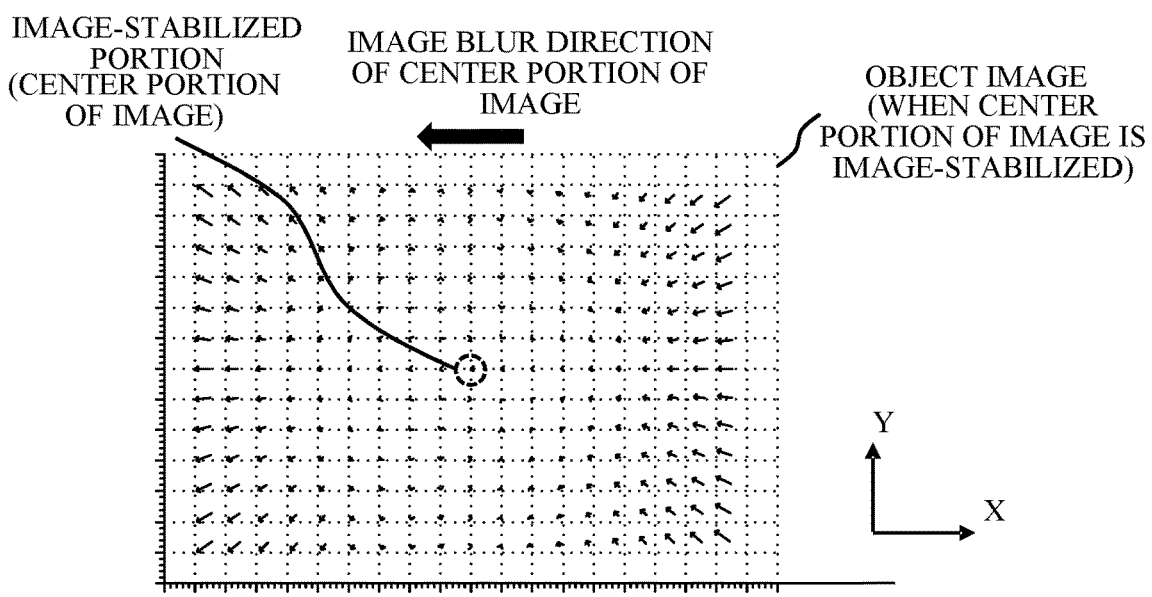
FIG. 9B illustrates the magnitude and direction of an image stabilization residue amount at each image point on the object image in a case where the image blur that occurs in the central portion of the image in FIG. 9A is corrected using the image sensor.

FIG. 8 is a flowchart illustrating a method of acquiring correction ratios for shift shake in this embodiment. In a case where the imaging magnification of the imaging optical system 101 is small, the image blur caused by the shift shake is so small that it can be ignored. The lens memory 103 or the camera memory 205 stores an imaging magnification βt (predetermined value) in a case where image blur caused by shift shake can be ignored.

In step S801, the lens control unit 104 determines whether the imaging magnification β is larger than the imaging magnification βt. In a case where the lens control unit 104 determines that the imaging magnification β is larger than the imaging magnification βt, the processing of step S802 is executed, and in a case where it determines that the imaging magnification β is smaller than the imaging magnification βt, the processing of step S803 is executed. In a case where the imaging magnification is equal to the imaging magnification βt, which step the lens control unit 104 executes can be arbitrarily set.

In step S802, the lens control unit 104 acquires the correction ratio for the lens-side image stabilization for shift shake (lens shift shake correction ratio Lsk) by a method similar to that of the first embodiment. The lens control unit 104 acquires the correction ratio for the camera-side image stabilization for shift shake (camera shift shake correction ratio Csk) by a method similar to that of the first embodiment.

In step S803, the lens control unit 104 sets the lens shift shake correction ratio Lsk and the camera shift shake correction ratio Csk to 0. That is, lens-side image stabilization and camera-side image stabilization are not performed.

In step S704, the lens control unit 104 acquires angular shake from the angular velocity sensor 107 and acquires shift shake using the detection results of the angular velocity sensor 107 and the acceleration sensor 108.

In step S705, the lens control unit 104 acquires a lens angular shake correction amount, which is a driving amount of the lens image stabilization unit 105 for angular shake, using a method similar to that of the first embodiment, the lens angular shake correction sensitivity Ltv, the lens angular shake correction ratio Ltk, and the angular shake. The lens control unit 104 acquires a lens shift shake correction amount, which is a driving amount of the lens image stabilization unit 105 for the shift shake, using a method similar to that of the first embodiment, the lens shift shake correction sensitivity Lsv, the lens shift shake correction ratio Lsk, and the shift shake.

In step S706, the lens control unit 104 drives the lens image stabilization unit 105 with a total value of the lens angular shake correction amount and the lens shift shake correction amount and corrects an image blur.

In step S707, the lens control unit 104 determines whether to end image stabilization. In a case where the lens control unit 104 determines to end the image stabilization, this flow ends. In a case where it determines not to end the image stabilization, the processing of step S708 is executed.

In step S708, the lens control unit 104 determines whether the state of the interchangeable lens 1, such as the focus state and the zoom state, has changed. In a case where the lens control unit 104 determines that the state of the interchangeable lens 1 has changed, the processing of step S701 is not executed. In a case where it determines that the state of the interchangeable lens 1 has not changed, the processing of step S704 is executed.

The image stabilization performed by the camera body 2 according to this embodiment is executed according to the flow of FIG. 5, similarly to the first embodiment, and a description thereof will be omitted.

As described above, the configuration of this embodiment can suppress the influence of image blur remaining in the peripheral portion of the image.

This embodiment can provide a control apparatus, a lens apparatus, an image pickup apparatus, an imaging system, a control method, and a storage medium, each of which can suppress the influence of image blurring remaining in the peripheral portion of an image.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-163359, filed on Oct. 11, 2022, which is hereby incorporated by reference herein in its entirety.

What is claimed is:

1. A control apparatus for use in an imaging system that includes a first correcting member movable for image stabilization and provided to one of an image pickup apparatus and a lens apparatus attached to the image pickup apparatus, and a second correcting member movable for the image stabilization and provided to the other of the image pickup apparatus and the lens apparatus, the control apparatus comprising:

a memory storing instructions; and
a processor configured to execute the instructions to:
acquire first correction ratios of the first correcting member and the second correcting member for angular shake of the imaging system, and
acquire second correction ratios of the first correcting member and the second correcting member for shift shake of the imaging system,
wherein the processor is configured to set one of the second correction ratios of the first correcting member for the shift shake to 0, and the processor is configured to set one of the second correction ratios of the second correcting member for the shift shake to 1, and
wherein the first correction ratios are ratios that are obtained by using information about an image point moving amount of an off-axis image height when one of the first correcting member and the second correcting member is shifted to include a directional component orthogonal to an optical axis.

2. The control apparatus according to claim 1, wherein the processor is configured to calculate the first correction ratios using the information about the image point moving amount of the off-axis image height in a case where the image stabilization is performed by the first correcting member for the angular shake, and the information about the image point moving amount of the off-axis image height in a case where the image stabilization is performed by the second correcting member for the angular shake.

3. The control apparatus according to claim 1, wherein the memory stores the first correction ratios and the second correction ratios, and the processor is configured to acquire the first correction ratios and the second correction ratios from the memory.

4. The control apparatus according to claim 1, wherein the processor is configured to correct the angular shake by moving at least one of the first correcting member and the second correcting member using the first correction ratios.

5. The control apparatus according to claim 1, wherein the processor is configured to correct the shift shake by moving at least one of the first correcting member and the second correcting member using the second correction ratios.

6. A lens apparatus comprising:
the control apparatus according to claim 1; and
an imaging optical system.

7. An image pickup apparatus comprising:
the control apparatus according to claim 1; and
an image sensor.

8. An imaging system comprising:
the control apparatus according to claim 1;
an imaging optical system; and
an image sensor.

9. A control method for use in an imaging system that includes a first correcting member movable for image stabilization and provided to one of an image pickup apparatus and a lens apparatus attached to the image pickup apparatus, and a second correcting member movable for the image stabilization and provided to the other of the image pickup apparatus and the lens apparatus, the control method comprising the steps of:

acquiring first correction ratios of the first correcting member and the second correcting member for angular shake of the imaging system, and acquiring second correction ratios of the first correcting member and the second correcting member for shift shake of the imaging system, wherein one of the second correction ratios of the first correcting member for the shift shake is set to 0, and one of the second correction ratios of the second correcting member for the shift shake is set to 1, and wherein the first correction ratios are ratios that are obtained by using information about an image point moving amount of an off-axis image height when one of the first correcting member and the second correcting member is shifted to include a directional component orthogonal to an optical axis.

10. A non-transitory computer-readable storage medium storing a program that causes a computer of the image pickup apparatus or lens apparatus to execute the control method according to claim 9.

11. A control apparatus for use in an imaging system that includes a first correcting member movable for image stabilization and provided to one of an image pickup apparatus and a lens apparatus attached to the image pickup apparatus, and a second correcting member movable for the image stabilization and provided to the other of the image pickup apparatus and the lens apparatus, the control apparatus comprising:

a memory storing instructions; and a processor configured to execute the instructions to:

acquire first correction ratios of the first correcting member and the second correcting member for angular shake of the imaging system, and acquire second correction ratios of the first correcting member and the second correcting member for shift shake of the imaging system, wherein in a case where a magnification of an imaging optical system included in the lens apparatus is higher than a predetermined value, the processor is configured to calculate the second correction ratios using information about an image point moving amount of off-axis image height in the image stabilization using the first correcting member performed for the shift shake, and information about the image point moving amount of the off-axis image height in the image stabilization using the second correcting member performed for the shift shake, and wherein in a case where the magnification of the imaging optical system is smaller than the predetermined value, the processor is configured to set the second correction ratios of the first correcting member and the second correcting member to 0.

* * * * *